United States Patent
Martin

(10) Patent No.: US 6,430,929 B2
(45) Date of Patent: Aug. 13, 2002

(54) TURBOCHARGER WITH INTEGRATED EXHAUST GAS RECIRCULATION VALVE

(75) Inventor: Steven P. Martin, West Covina, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/782,810

(22) Filed: Feb. 14, 2001

Related U.S. Application Data
(60) Provisional application No. 60/186,647, filed on Mar. 3, 2000.

(51) Int. Cl.[7] ............................................. F02B 33/44
(52) U.S. Cl. ................ 60/605.2; 251/123; 123/568.18; 123/568.27; 123/568.23
(58) Field of Search ................ 60/602, 605.2; 123/568.18, 568.19, 568.2, 568.23, 568.27; 251/123

(56) References Cited

U.S. PATENT DOCUMENTS

| | | | | |
|---|---|---|---|---|
| 5,617,726 A | * | 4/1997 | Sheridan et al. | 60/605.2 |
| 5,943,864 A | * | 8/1999 | Sumser et al. | 60/605.2 |
| 5,947,681 A | | 9/1999 | Rochford | |
| 6,000,222 A | | 12/1999 | Regnier | |
| 6,026,791 A | * | 2/2000 | Arnold | 60/605.2 |
| 6,032,465 A | * | 3/2000 | Regnier | 60/605.2 |
| 6,062,535 A | * | 5/2000 | Ruth et al. | 123/568.27 |
| 6,089,019 A | * | 7/2000 | Roby et al. | 60/605.2 |
| 6,168,134 B1 | * | 1/2001 | Ruth et al. | 123/568.27 |
| 6,263,672 B1 | * | 7/2001 | Ropby et al. | 60/605.2 |

FOREIGN PATENT DOCUMENTS

| | | | |
|---|---|---|---|
| WO | WO 99 31375 A | 6/1999 | |
| WO | WO-009935390 A1 * | 7/1999 | 60/605.2 |

OTHER PUBLICATIONS

Patent Abstracts of Japan vol. 004, No. 171(M–044), Nov. 26, 1980 & JP 55 123344 A Nissan Motor Co. Ltd; Sep. 22, 1980 abstract.

* cited by examiner

*Primary Examiner*—Thomas Denion
*Assistant Examiner*—Thai-Ba Trieu
(74) *Attorney, Agent, or Firm*—Ephraim Starr; Felix Fischer

(57) ABSTRACT

An Exhaust Gas Recirulation (EGR) valve is integrated onto a turbocharger by providing an EGR outlet in a flange in the volute of the turbine housing and a mating valve assembly extending from a mating flange with an elbow. The outlet direction of the elbow is adjustable to a plurality of directions by positioning the mating flange relative to the EGR outlet flange.

5 Claims, 6 Drawing Sheets

TURBOCHARGER WITH INTEGRATED EXHAUST GAS RECIRCULATION VALVE

CROSS REFERENCE TO RELATED APPLICATIONS

This application claims the priority of copending application Ser. No. 60/186,647 filed on Mar. 03, 2000 having the same title as the present application.

BACKGROUND OF THE INVENTION

1. Field of the Invention

The present invention relates generally to exhaust gas recirculation (EGR) systems, and more particularly, to an EGR valve integrated into a turbocharger with a valve inlet cast into the turbine housing and an actuation system mounted directly to the turbocharger.

2. Description of the Prior Art

Commercial Diesel EGR Systems require an EGR valve to control the flow of exhaust gas into the intake manifold. Commercial Diesel EGR Systems are characterized by very challenging packaging constraints of the EGR system, within the existing vehicle envelope, sensitivity to EGR system pressure losses and fuel consumption.

Present EGR systems are typically configured using separate components for each element of the system. This approach does not allow optimization of the system to accommodate the challenges described.

SUMMARY OF THE INVENTION

The present invention addresses the packaging and EGR system pressure loss resulting in a minimized effect on the vehicle fuel consumption. An EGR valve is incorporated onto a turbocharger turbine housing in a more compact manner than a separate EGR valve assembly (which is more typical within the component suppliers). In addition, the EGR valve is located such that the EGR system pressure losses are minimized (relative to the EGR valve). This is accomplished by taking advantage of the dynamic pressure associated with the turbine inlet flow. The design of the EGR valve integration provides "infinite" flexibility in the orientation of the EGR valve outlet relative to the turbocharger centerline. This feature aids significantly in the packaging of the EGR system within the vehicle installation constraints. The design of the EGR valve lends itself to this packaging advantage. The invention employs a "swing valve" design. A EGR port is cast into the turbocharger turbine housing such that the gas dynamics of the engine exhaust entering the turbine housing supplements the flow of exhaust gas into the EGR system therefore reducing the EGR system pressure losses. The EGR valve is attached to the turbine housing such that the exhaust port from the EGR valve may be directed in an infinite number of directions without redesign of the turbocharger, turbine housing, or EGR valve sub-assembly.

The EGR valve actuator, and associated actuator mounting bracket are combined as a sub-assembly for mounting to the turbocharger permitting the EGR valve exhaust port to be directed in the best orientation for the EGR System/engine packaging.

BRIEF DESCRIPTION OF THE DRAWINGS

These and other features and advantages of the present invention will be appreciated as the same become better understood by reference to the following Detailed Description when considered in connection with the accompanying drawings, wherein.

DETAILED DESCRIPTION OF THE INVENTION

Figure 1:
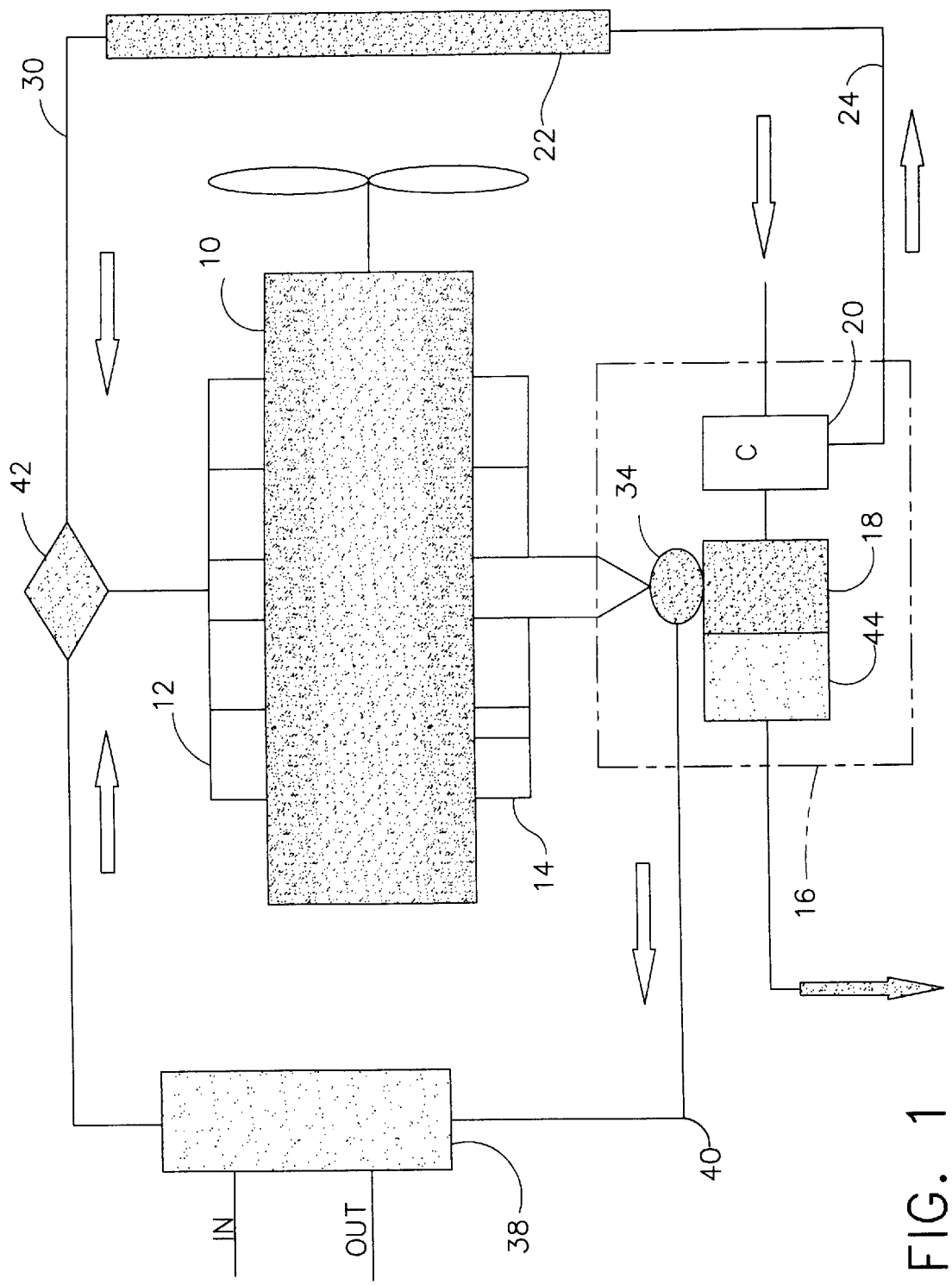
FIG. 1 is a schematic illustration of an internal combustion engine having an EGR system employing a turbocharger with an integrated EGR valve according to the present invention.

Referring now to FIG. 1, an EGR system is schematically illustrated in an internal combustion engine having a turbocharger and an EGR system. Engine 10 includes an intake manifold 12 and an exhaust manifold 14. In the illustrated embodiment, the engine includes a turbocharger 16, generally comprising a turbine contained in a housing 18 and a compressor contained in a housing 20, for compressing the intake air of engine 10. The intake air is heated during the turbocharger compression process and must be cooled to satisfy engine durability and performance requirements. That cooling is accomplished by routing the air discharged from the turbocharger 16 to a charger air cooler (CAC) 22 via conventional conduits or ducting 24. The intake air is then routed from the CAC to the intake manifold of the engine via conventional conduits or ducting 30.

Engine 10 also includes an EGR system. The EGR system includes a control valve 34, integrated into the turbocharger in accordance with the present invention, that regulates the proportion of exhaust gas that is taken from the exhaust manifold and either returned to the engine induction system for mixing with the intake air that has passed through the CAC, or directed to the turbine of the turbocharger. The control valve 34 routes a portion of the exhaust gas received into the turbine housing from the exhaust manifold through the EGR system.

The EGR system also includes an engine mounted EGR cooler 38 or heat exchanger for cooling the exhaust gas passing through the system. By providing a heat exchanger in the EGR conduit or ducting 40, the efficiency of engine 10 is improved. Other advantages, such as a reduction in NOx and PM emissions and in fuel consumption also result from the presence of the heat exchanger 38. The exhaust gas passing through the heat exchanger 38 is then combined with the intake air that has passed through the CAC in an EGR mixer 42. The mixture of the intake air and exhaust gas leaves the mixer 42 and enters the intake manifold of the engine.

A variable geometry nozzle 44 in the turbocharger is utilized for back pressure in the turbine housing inlet and exhaust manifold.

Figure 2:
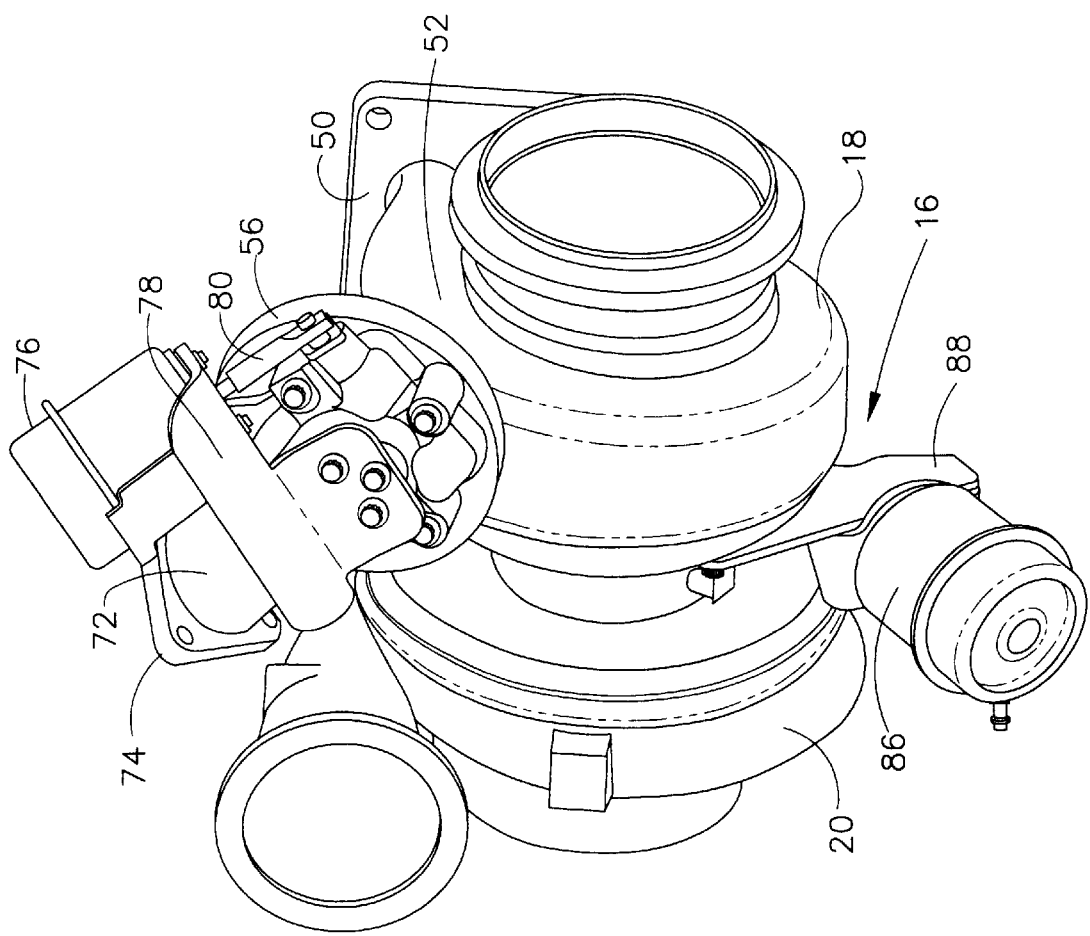
FIG. 2 is a pictorial view of an embodiment of turbocharger having an integrated EGR valve incorporating the present invention.
Figure 3:
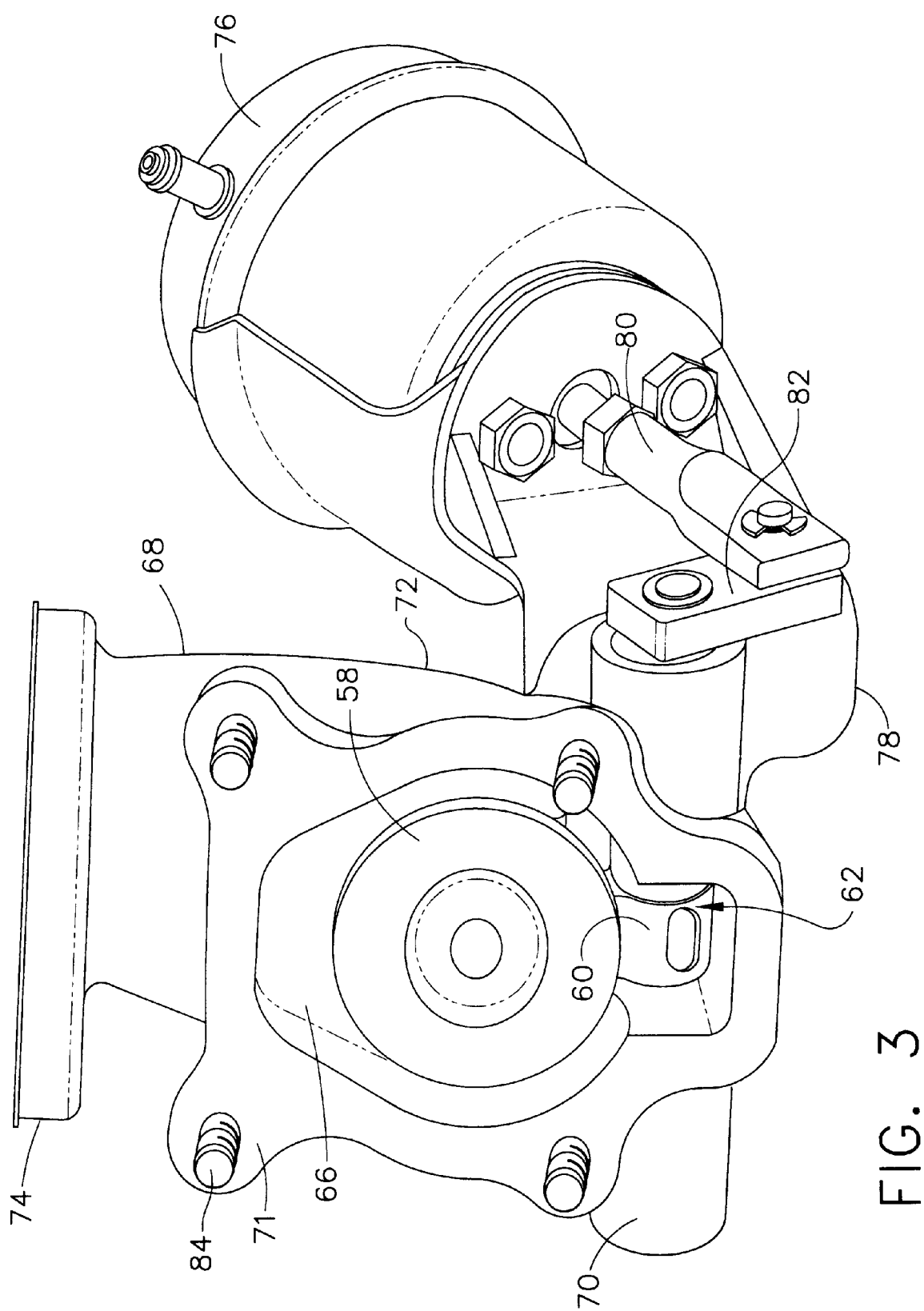
FIG. 3 is a cutaway view of the valve poppet and actuator for the EGR valve of FIG. 2.
Figure 4:
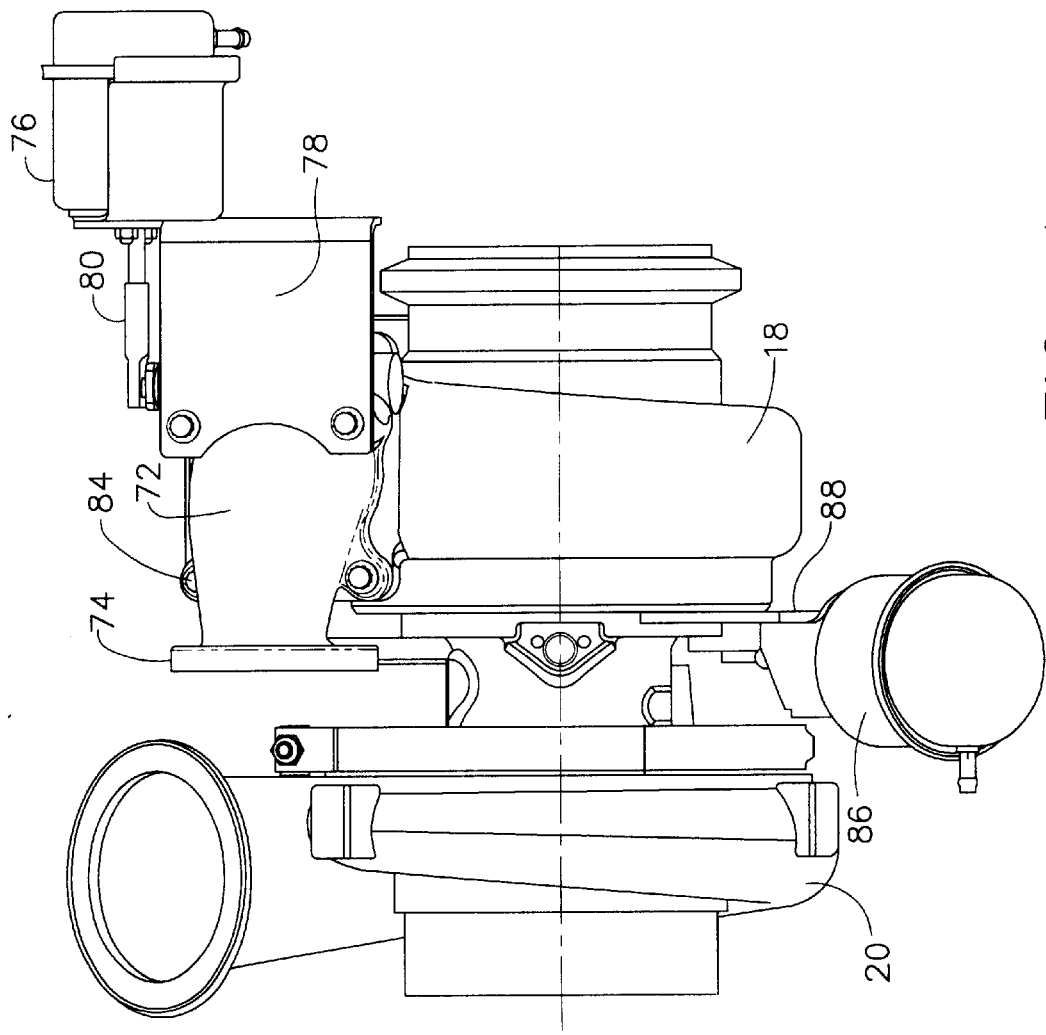
FIG. 4 is a top view of the turbocharger disclosed in FIG. 2.
Figure 5:
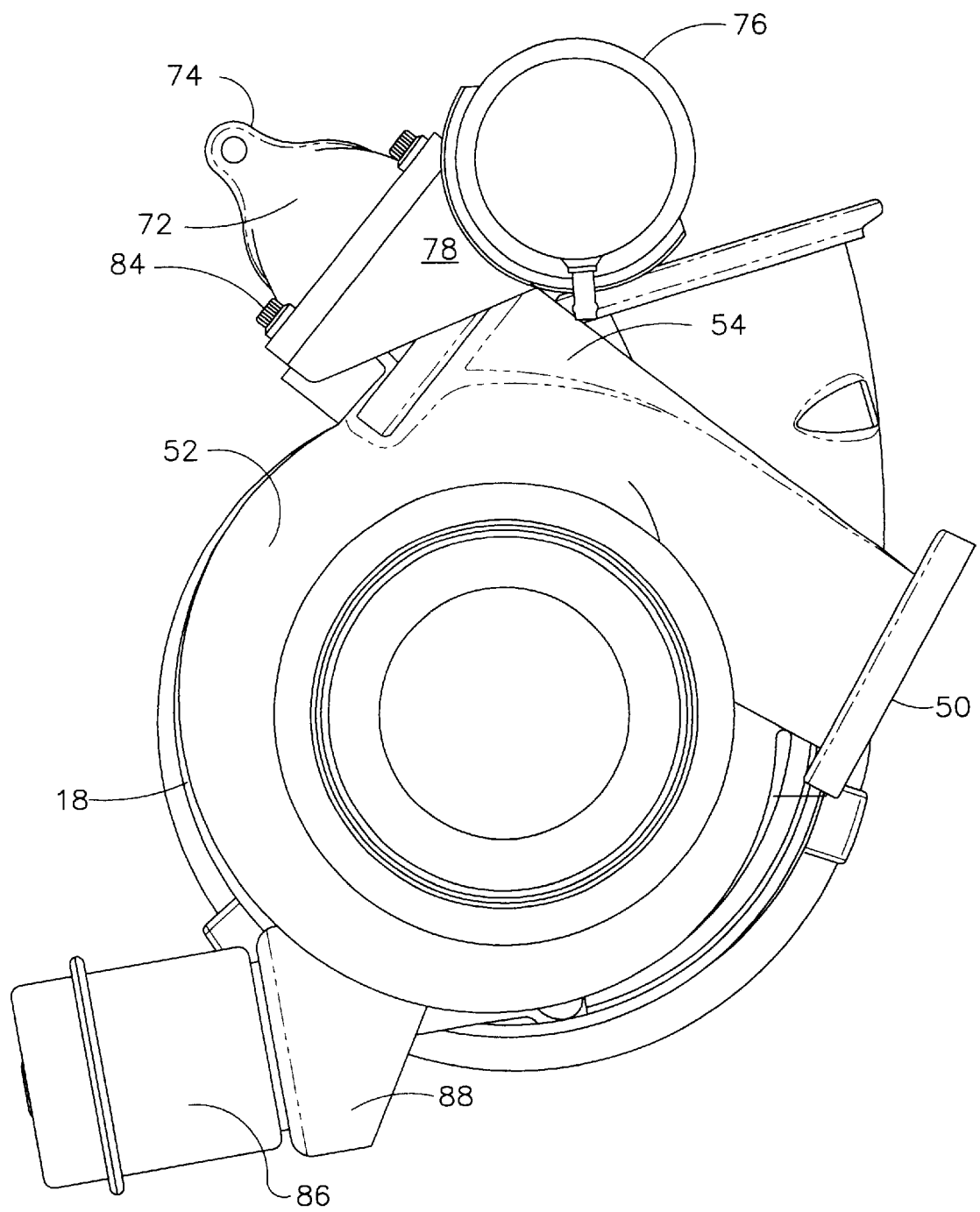
FIG. 5 is an end view of the turbocharger disclosed in FIG. 2.
Figure 6:
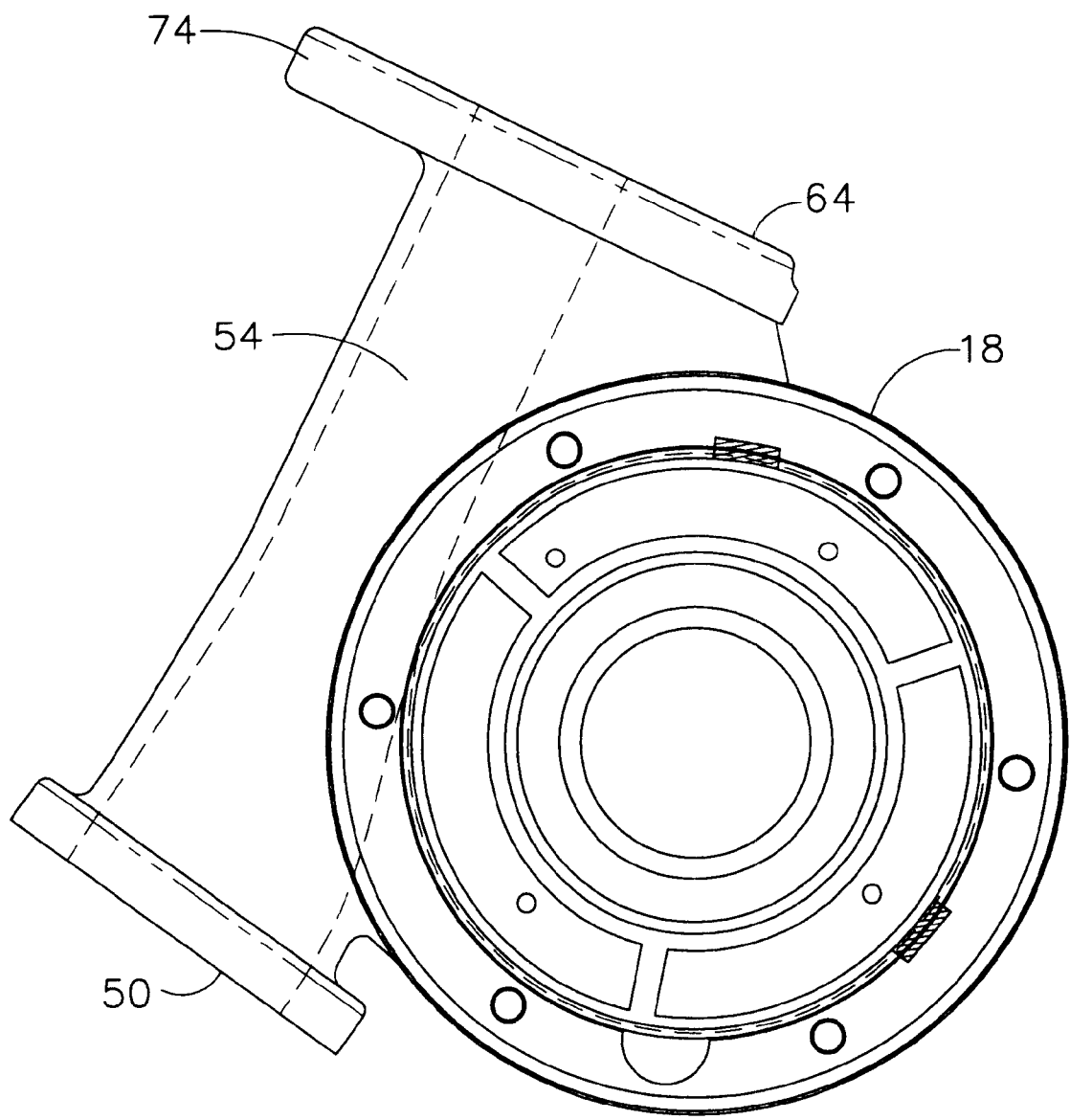
FIG. 6 is a section view of the turbine housing casting of the turbocharger disclosed in FIG. 2.

FIGS. 2, 4 and 5 show the turbocharger 16 incorporating the present invention in greater detail. The turbine housing 18 includes an inlet 50 from the exhaust manifold of the engine. Exhaust gas entering the inlet flows into a torus or volute 52. An EGR outlet 54 from the volute is cast into the turbine housing as shown in FIG. 6. The location and orientation of the EGR outlet tangentially to the volute and substantially linearly along the flow stream entering the turbine housing inlet, minimizes the pressure losses for the extracted EGR flow. A flange 56 is provided for mounting the EGR valve assembly shown in detail in FIG. 3.

The EGR valve includes a poppet 58 which is mounted by an arm 60 to an axle 62 for pivoting the poppet from a closed position on a seat 64, shown in FIG. 6, at the exit of the EGR outlet, to an open position with the poppet rotated into a chamber 66 in the valve casting 68. The valve casting includes a bored boss 70 receiving the axle and a mating flange 71 for flange 56 on the turbine housing. For the embodiment shown, the valve casting includes an elbow 72, which terminates in a flange 74 for attachment to the EGR conduit 40. A pneumatic actuator 76 is mounted by a bracket 78 to the valve casting and incorporates an actuating arm 80 which connects to a crank 82 extending from the axle.

The mating flange is connected to flange 56 using bolts 84. The mating hole pattern on the flange 56 can be adapted to allow any desired orientation of the elbow to accommodate varying engine arrangements for EGR plumbing.

For the embodiment shown in the drawings, the turbocharger includes a second actuator 86 for control of the variable geometry turbine inlet nozzle 44 which provides a means for controlling backpressure in the exhaust system and turbine volute to control EGR flow rate in combination with the EGR valve. In the embodiment shown the second actuator is pneumatically actuated and mounted to the turbine housing with a bracket 88. For the embodiment shown in the drawings, the variable geometry nozzle is constructed as disclosed in U.S. Pat. No. 5, 947,681 entitled PRESSURE BALANCED DUAL AXLE VARIABLE NOZZLE TURBOCHARGER issuing on Sep. 7, 1999 having a common assignee with the present application, the disclosure of which is incorporated herein by reference.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A turbocharger having an integral Exhaust Gas Recirculation (EGR) valve comprising:

a turbine housing having an exhaust gas inlet receiving exhaust gas and a volute for directing the exhaust gas to a turbine nozzle, said volute having a flange incorporating an EGR outlet tangential to the circumference of the volute and substantially linearly aligned with a stream line of the exhaust gas entering the inlet;

an EGR valve assembly including
a mating flange to engage the EGR outlet flange in a selected one of a plurality of orientations,
an elbow extending from the mating flange for attachment to an EGR conduit, the direction of attachment of said elbow to said EGR conduit determined by the selected orientation of the mating flange,
an adjustable valve mounted within the elbow and having at least two adjustment positions, a first position closing the EGR outlet and a second open position, and
means for adjusting the valve between the first and second positions.

2. The turbocharger as defined in claim 1 wherein the adjustable valve comprises a poppet sealable against a seat surrounding the EGR outlet.

3. The turbocharger as defined in claim 2 wherein the poppet is attached to an arm extending from a rotatable axle and said adjusting means comprises a crank extending from the axle and an actuator for positioning the crank to rotate the axle whereby the first position of the valve seals the poppet on the seat and the actuator rotates the axle to pivot the poppet to the second open position.

4. The turbocharger as defined in claim 3 wherein the actuator is a pneumatic actuator.

5. The turbocharger as defined in claim 1 wherein the nozzle includes variable geometry means for controlling backpressure in the volute.

* * * * *